May 17, 1966 R. F. SEYFRIED 3,251,974

METAL FORMING APPARATUS

Filed March 28, 1963

INVENTOR.
RICHARD F. SEYFRIED

BY Tilberry & Body

ATTORNEYS

United States Patent Office 3,251,974
Patented May 17, 1966

3,251,974

METAL FORMING APPARATUS

Richard F. Seyfried, Parma Heights, Ohio, assignor to The Ohio Crankshaft Company, Cleveland, Ohio, a corporation of Ohio Filed Mar. 28, 1963, Ser. No. 268,653
4 Claims. (Cl. 219—7.5)

Figure 1:
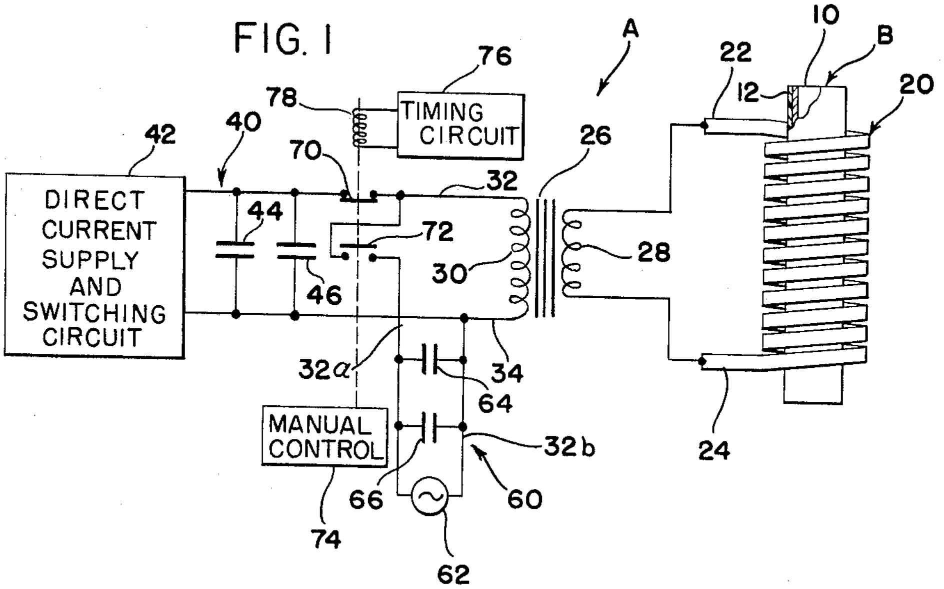

The present invention pertains to the art of metal forming and more particularly to an apparatus for forming a metallic workpiece by subjecting the workpiece to a rapidly changing high energy magnetic field.

The invention is particularly applicable to forming a tubular metallic workpiece and it will be discussed with particular reference thereto; however, it is to be appreciated that the invention has much broader applications and may be used for forming metallic workpieces having various shapes such as, without limitation, flat metallic workpieces.

There has been developed an apparatus for magnetically forming metallic workpieces by setting up a rapidly changing magnetic field and maintaining the metallic workpiece within the magnetic field so that sufficient energy is transferred from the magnetic field into a certain portion of the metallic workpiece to form the workpiece into a desired shape. Such an apparatus comprises a conductor so constructed to provide the necessary magnetic field and an electric means for applying current pulses through the conductor to establish the magnetic field around the conductor. In order to obtain the necessary energy in the magnetic field, it has become accepted practice to utilize in the electric pulsing means a capacitor having high capacitive reactance. The physical size of the capacitor determines, to a certain extent, the energy level of the magnetic field available for forming the workpiece.

It has been found that even ductile material such as aluminum and copper can be conveniently formed by such a magnetic forming apparatus only when a high capacity capacitor is used in the pulsing circuit and when the workpiece is relatively thin, i.e., having a wall thickness of .005 inch. As the wall thickness of the workpiece increases or the ductility of the workpiece decreases, i.e., when steel is being formed, the capacitance of the capacitor necessary to generate the desired magnetic field energy is so large that the process becomes impractical. Accordingly, magnetic forming devices, as described above, have been limited to forming very thin walled, ductile pieces formed of aluminum, copper or similar materials.

The present invention is directed toward an improvement in a magnetic forming apparatus as described above which improvement allows the apparatus to form metals having greater thickness and less ductility than heretofore possible. In addition, the improvement in such a magnetic forming apparatus allows forming of the more ductile materials with a lesser magnetic energy level than heretofore possible.

In accordance with the present invention, there is provided an improvement in an apparatus for forming a metallic workpiece of the type described above which apparatus includes a conductor shaped to provide a predetermined magnetic field and a circuit for applying at least one predetermined current pulse through the conductor so that a high energy magnetic field is created around the conductor for forming the workpiece. The improvement in such an apparatus comprises a second, separate circuit for applying a high frequency alternating current through the same conductor used for creating the high energy magnetic field and a switching means for selectively connecting the first or second-mentioned circuits across the conductor. In this manner, the same conductor can be utilized first for inductively heating the workpiece to increase its ductility and then for creating a high energy magnetic field around the conductor for forming the more ductile workpiece into the desired shape.

The primary object of the present invention is the provision of an improved magnetic forming apparatus of the type described above which requires less magnetic field energy for forming a given metallic workpiece.

Another object of the present invention is the provision of an improved magnetic forming apparatus which can easily form a workpiece having lesser ductility than heretofore practical.

Yet another object of the present invention is the provision of an improved magnetic forming apparatus which can form less ductile metallic workpieces without a corresponding increase in the physical size of the operating components.

Another object of the present invention is the provision of an improved magnetic forming apparatus of the type described above which apparatus has a conductor adjacent the workpiece, a first circuit for applying pulses to the conductor to create a varying high energy magnetic field for forming the workpiece, a second circuit for applying a high frequency alternating current to the same conductor, and a switching means for selectively connecting the first and second circuits to the conductor.

Yet another object of the present invention is the provision of an improved magnetic forming apparatus as defined above which apparatus first increases the ductility of the metal workpiece by inductively heating the workpiece with a conductor and then forms the workpiece by pulsing a high current through the same conductor to create a rapidly changing high energy magnetic field acting upon the workpiece.

Still another object of the present invention is the provision of a method for forming a metallic workpiece which method comprises the steps of first inductively heating the workpiece with a conductor adjacent thereto and then forming the workpiece with a rapidly changing high energy magnetic field created by a pulsing current passing through the same conductor used for heating the workpiece.

Figure 2:
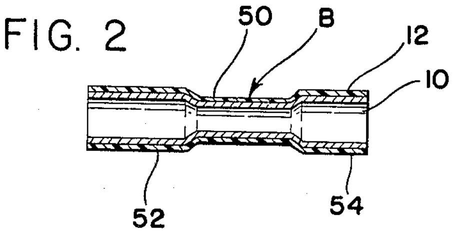

These and other objects and advantages will become apparent from the following description used to illustrate the preferred embodiment of the present invention as read in connection with the accompanying drawings in which:

FIGURE 1 is a schematic view of the preferred embodiment of the present invention; and FIGURE 2 is a reduced cross-sectional view of the workpiece showing FIGURE 1 after the operation of the metal forming apparatus as disclosed in FIGURE 1.

Referring now to the drawing, wherein the showings are for the purpose of illustrating a preferred embodiment of the invention only and not for the purpose of limiting same, FIGURE 1 shows an apparatus A for magnetically forming a tubular, metal workpiece B into a predetermined desired shape. In order to better appreciate the invention, the illustrated workpiece B comprises an inner tube 10 formed from a metal such as steel which is considerably less ductile at room temperature than a tube of aluminum or copper and an outer tube 12 formed from a thermoplastic material which is easily fractured if deformed at room temperature.

The apparatus A includes a conductor 20 adapted to surround the workpiece B and, in accordance with the preferred embodiment of the present invention, the conductor 20 takes the form of a solenoid coil formed from large diameter conductive material such as copper and having leads 22, 24. To power the conductor 20, there is provided, in accordance with the illustrated embodiment of the present invention, a transformer 26 having a secondary winding 28 connected across leads 22, 24 and a primary winding 30 connected to leads 32, 34.

Pulses are supplied to the transformer 26 by a first circuit 40 and this, in turn, creates a pulse or series of pulses of current through the conductor 20. Although a variety of circuits could be utilized for creating the pulse or pulses of current in the conductor 20, in accordance with the illustrated embodiment of the present invention which is represented somewhat schematically, the first circuit 40 comprises a D.C. supply and switching circuit 42 for first applying a high voltage to high capacitive reactance capacitors 44, 46 and subsequently discharging said voltage through the primary winding 30. In this manner, circuit 40 supplies a pulse or pulses of current through conductor 20 and the energy of these pulses is determined, somewhat, by the capacitative reactance of capacitors 44, 46.

In operation of the apparatus A as so far described, when the current pulses are applied to the conductor 20, a rapidly changing high energy magnetic field is created which induces an electromotive force in the workpiece B and a high current flow around the workpiece. If the energy transferred to the workpiece by the interaction of the induced current in the magnetic field is sufficient, a force is created sufficient to cause the tubular wall of the portion of the workpiece surrounded by the conductor 20 inwardly into the general form shown in FIGURE 2 wherein the reduced central portion 50 between larger portions 52, 54 is the portion of the workpiece B encompassed or surrounded by conductor 20. If desired, a suitable die (not shown) may be inserted into the workpiece to define or limit the inward deformation of the workpiece B. Because of the high acceleration that can be developed in the workpiece by this method, a die in the ordinary sense may not be necessary. In certain cases, the die need not have great strength; instead, it may depend upon its mass alone to decelerate the inwardly deforming workpiece.

It should be appreciated that the conductor 20 may be formed into various configurations and the number of turns may vary in accordance with the workpiece being formed. In essence, the conductor 20 creates a high energy magnetic field that interacts with the induced currents flowing in the workpiece B to create a force within the workpiece to deform the same.

In accordance with the improvement as contemplated by the present invention, the apparatus A is further provided with a second circuit 60 for applying a high frequency alternating current to the primary winding 30 so that the conductor is supplied with a high frequency current by the secondary winding 28. To create the high frequency current, circuit 60 includes a high frequency generator 62 connected across leads 32, 34 by leads **32*a*, 32*b* respectively. Accordingly, the circuit 60 is connected across the primary winding 30 in electrical parallel with the first mentioned circuit 40. The alternating high frequency current created by circuit 60 induces a corresponding high frequency current flow within the metal tube 10 so that the tube is inductively heated in a manner commonly known in the induction heating art. The frequency of the generator 62** is selected as is known in the art of induction heating, taking into consideration the resistivity of the metal, the thickness and dimensions. 3,000, 10,000, or 450,000 cycles per second are typical frequencies.

In accordance with the illustrated embodiment of the present invention, capacitors 64, 66 are utilized to correct the power factor of the second-mentioned circuit during the inductive heating of the workpiece B.

Means are provided for selectively connecting the circuits 40, 60 across the primary winding 30. In accordance with the illustrated embodiment of the present invention such means include a switch 70 in the forming circuit 40 and a switch 72 in the heating circuit 60. These switches are so correlated that one is opened when the other is closed to prevent simultaneous energization of winding 30 by both circuits. To operate switches 70, 72 there is provided a manual control 74 that can be appropriately actuated to close a certain one of the switches 70, 72. If a plurality of workpieces are to be formed by apparatus A, it is proposed to employ a timing circuit 76 adapted to actuate solenoid 78 to close either switch 70 or switch 72. The timing circuit may take a variety of structural embodiments; however, it should so operate that the circuit 60 is first connected to the primary winding 30 for a given time after which the switch 72 is opened and switch 70 is closed so that the forming circuit 40 is then connected across the primary winding of the transformer. It is appreciated that there is provided a means for deactivating the apparatus A after the desired form is imparted to the workpiece B.

In operation of the apparatus A, timing circuit 76 is so actuated to close switch 72 and open switch 70 which connects the heating circuit, or second circuit, across the primary winding 30. Accordingly, a high frequency current flows through conductor 20 and inductively heats the workpiece B. This heating of the workpiece reduces the ductility of the inner tube 10 and plasticizes the thermosetting tube 12 so that the workpiece B can be deformed inwardly without fracturing the plastic forming tube 12 and with substantially less power than would be required to deform tube 10 had it not been previously heated. When the workpiece has been raised to the desired temperature, the timing circuit 76 opens switch 72 and closes switch 70 which disconnects the heating circuit 60 and, in turn, connects the forming circuit 40. At this time, the previously heated workpiece B is readily deformed inwardly by the high energy magnetic field created by pulse or pulses of current through conductor 20.

It is to be appreciated that the conductor may surround the workpiece B to form the walls inwardly or may be within the workpiece to form the walls outwardly. Also, a die may be positioned on the side of the workpiece opposite the conductor so that the desired shape can be imparted to the workpiece by forcing the same against the die.

The present invention has been discussed in connection with one preferred embodiment thereof; however, it is to be appreciated that various structural changes may be made without departing from the intended spirit and scope of the invention as defined in the appended claims.

Having thus described my invention, I claim:

1. An apparatus for forming a metallic workpiece comprising a conductor shaped to provide a predetermined magnetic field, a first circuit for applying at least one predetermined current pulse through said conductor, means for positioning said workpiece adjacent said conductor and within said magnetic field, said current pulse being of such strength and being effective to form said workpiece into the desired shape, a second circuit for applying a high frequency alternating current through said same conductor, and means for first connecting said second circuit onto said conductor and, then, disconnecting said second circuit and connecting said first circuit.

2. An apparatus as defined in claim 1 wherein said connecting means includes a timing circuit for switching from said second circuit to said first circuit after a predetermined time delay.

3. A method of forming a metallic workpiece comprising, inductively heating said workpiece by passing a high frequency current through a conductor adjacent said workpiece, and, then magnetically forming said heated workpiece with a varying high energy field created by passing a high energy current pulse through said same conductor.

4. A method of forming a metallic workpiece comprising inductively heating said workpiece to a temperature to make said workpiece substantially more ductile, setting up a predetermined varying magnetic field, and maintaining said workpiece within said field so that sufficient energy is transferred from the magnetic field to certain portions of the metallic workpiece to form the workpiece into the desired shape.

References Cited by the Examiner

UNITED STATES PATENTS

| | | | |
|---|---|---|---|
| 2,976,907 | 3/1961 | Harvey et al. | 153—10 |
| 3,088,200 | 5/1963 | Birdsall et al. | 29—421 |

RICHARD M. WOOD, *Primary Examiner.*